United States Patent [19]
Shimatani et al.

[11] Patent Number: 5,331,342
[45] Date of Patent: Jul. 19, 1994

[54] VIDEO CLOCK GENERATING CIRCUIT AND HORIZONTAL SYNCHRONIZING SIGNAL GENERATING DEVICE IN IMAGE FORMING APPARATUS USING LASER BEAM

[75] Inventors: Akira Shimatani, Sakai; Takuji Okumura, Tondabayashi, both of Japan

[73] Assignee: Mita Industrial Co., Ltd., Osaka, Japan

[21] Appl. No.: 845,656

[22] Filed: Mar. 4, 1992

[30] Foreign Application Priority Data

Mar. 12, 1991 [JP] Japan .................. 3-047058

[51] Int. Cl.⁵ .................. B41J 2/435; H04N 1/21
[52] U.S. Cl. .................. 346/108; 388/409; 388/474
[58] Field of Search .......... 346/108, 107 R, 76 L, 346/1.1, 160; 358/409, 474

[56] References Cited

U.S. PATENT DOCUMENTS

| | | |
|---|---|---|
| 4,663,523 | 5/1987 | Swanberg . |
| 4,796,095 | 1/1989 | Shimada .................. 358/474 |
| 4,926,263 | 5/1990 | Yokota . |
| 5,115,256 | 5/1992 | Miyagi et al. .................. 346/108 |

FOREIGN PATENT DOCUMENTS

| | | |
|---|---|---|
| 210618 | 2/1987 | European Pat. Off. . |
| 322792 | 7/1989 | European Pat. Off. . |
| 3013841 | 10/1980 | Fed. Rep. of Germany . |

OTHER PUBLICATIONS

Patent Abstracts of Japan, vol. 12, No. 134 (M-689) Apr. 23, 1988 & JP-A-62 257 856 (Copal Electron Co. Ltd.) Nov. 10, 1987.
Patent Abstracts of Japan, vol. 12, No. 9 (E-572) Jan. 12, 1988 & JP-A-62 169 575 (Hitachi Ltd.) Jul. 25, 1987.

*Primary Examiner*—Mark J. Reinhart
*Attorney, Agent, or Firm*—Beveridge, DeGrandi, Weilacher & Young

[57] ABSTRACT

A basic clock generated from a crystal oscillator is delayed by a constant time in each of a plurality of delay elements connected in series. Consequently, internal clocks which differ in phase by a predetermined amount are outputted from the delay elements. Output signals of the delay elements are inputted to a clock selector. The clock selector selects any one of the internal clocks on the basis of a beam detection signal indicating the timing of the scanning of a photoreceptor by a laser beam to output the same as a video clock. The clock selector selects any one internal clock whose phase difference from the beam detection signal is closest to a predetermined phase difference out of the internal clocks, the phase difference from the beam detection signal meaning the time difference between the time when the beam detection signal has a predetermined phase angle and the time when the internal clock has a predetermined phase angle. A horizontal synchronizing signal is generated by counting a video clock at the timing based on the beam detection signal. The video clock outputted from the clock selector is synchronized with the beam detection signal with high precision. As a result, the horizontal synchronizing signal generated can be synchronized with the beam detection signal with high precision.

12 Claims, 11 Drawing Sheets

VIDEO CLOCK GENERATING CIRCUIT AND HORIZONTAL SYNCHRONIZING SIGNAL GENERATING DEVICE IN IMAGE FORMING APPARATUS USING LASER BEAM

BACKGROUND OF THE INVENTION

1. Field of the Invention

The present invention relates to a video clock generating circuit used in an image forming apparatus using a laser beam, such as a laser beam printer and a digital copying machine, for generating a video clock for defining a data processing operation for each pixel. Furthermore, the present invention relates to a horizontal synchronizing signal generating device for generating a horizontal synchronizing signal for synchronizing laser beam scanning and image data processing.

2. Description of the Prior Art

In a laser beam printer conventionally used, an image is printed as follows. A photoreceptor is scanned by a laser beam subjected to modulation based on data corresponding to an image to be printed. Then, an electrostatic latent image formed on the photoreceptor is developed into a toner image, and the toner image is transfered and fixed to paper. In such a laser beam printer, the scanning of the photoreceptor by the laser beam and the modulation of the laser beam based on the image data must be synchronized with each other. Therefore, a beam detection signal corresponding to the timing of the scanning of the photoreceptor by the laser beam is generated by, for example, detecting the laser beam in a predetermined position, and a so-called horizontal synchronizing signal which is synchronized with the beam detection signal is generated. This horizontal synchronizing signal is synchronized with the laser beam scanning. Accordingly, if the laser beam is subjected to the modulation corresponding to the image data in accordance with a video clock inside of the laser beam printer on the basis of the horizontal synchronizing signal, an electrostatic latent image corresponding to a desired image can be formed on the photoreceptor. The above described video clock is a clock for defining a processing operation corresponding to image data for each pixel, which is generally generated independently of the beam detection signal.

FIG. 11 is a timing chart for explaining the technique of generating a horizontal synchronizing signal which has been conventionally used in the laser beam printer. Line (a) of FIG. 11 shows a beam detection signal, FIG. 11 (b) shows a video clock, and line (c) of FIG. 11 shows a horizontal synchronizing signal. In this conventional technique, the timing (time t1) of the first rising of the video clock after the falling of the beam detection signal is detected. The horizontal synchronizing signal is so generated as to fall in synchronization with the first rising of the video clock after the falling of the beam detection signal and to have a pulse width corresponding to a constant number of periods of the video clock from this falling.

In the above described conventional technique, a time interval Δt between the falling of the beam detection signal and the falling of the horizontal synchronizing signal depends on the relationship between the beam detection signal and the video clock. Therefore, variation corresponding to a maximum of one period of the video clock may occur in the time interval Δt. This variation causes the time relationship between the laser beam scanning and the horizontal synchronizing signal to differ for each scanning line formed on the photoreceptor by the laser beam. Consequently, the image formed on the paper is shifted by a maximum of one pixel between a plurality of scanning lines.

In order to reduce the shift of the image, the frequency of the video clock for synchronizing the beam detection signal and the horizontal synchronizing signal must be significantly increased. In this case, however, the processing speed of a horizontal synchronizing signal generating circuit is significantly increased, thereby to make it difficult to design the circuit, and a high frequency signal is handled, thereby to make it very difficult to take measurements against noise.

SUMMARY OF THE INVENTION

Therefore, an object of the present invention is to provide a video clock generating circuit in an image forming apparatus using a laser beam which allows a good image to be formed without using a signal having an excessively high frequency.

Another object of the present invention is to provide a horizontal synchronizing signal generating device in an image forming apparatus using a laser beam capable of forming a good image without using a signal having an excessively high frequency.

In order to attain the objects, in the video clock generating circuit according to the present invention, the phase of a signal having a reference frequency is shifted, to generate a plurality of signals which differ in phase by a predetermined amount. A signal having a constant relationship with a beam detection signal corresponding to the timing of laser beam scanning is selected as a video clock from the plurality of signals. More specifically, a signal whose phase difference from the beam detection signal is closest to a predetermined phase difference out of the plurality of signals which differ in phase by the predetermined amount is selected as a video clock.

The phase difference from the beam detection signal shall mean the time difference between the time when the beam detection signal has a predetermined phase angle and the time when the signal obtained by shifting the phase of the signal having a reference frequency has a predetermined phase angle.

In this construction, the variation in the relationship between the beam detection signal and the video clock is suppressed to the phase difference between the plurality of signals obtained by shifting the phase of the signal having a reference frequency (that is, the above described predetermined amount). If a horizontal synchronizing signal is generated on the basis of the video clock which is thus synchronized with the beam detection signal with high precision, the horizontal synchronizing signal generated can be synchronized with the laser beam scanning with high precision.

Furthermore, in the horizontal synchronizing signal generating device in the image forming apparatus using the laser beam according to the present invention, the video clock generated by the above described video clock generating circuit is counted on the basis of the beam detection signal, thereby to generate a horizontal synchronizing signal which is synchronized with the above described beam detection signal.

In this construction, the video clock which is synchronized with the beam detection signal with high precision is counted at the timing based on the beam detection signal, thereby to generate a horizontal synchronizing signal. As a result, the horizontal synchronizing signal generated can be synchronized with the beam detection signal with high precision. Consequently, the variation in the time relationship between the beam detection signal and the horizontal synchronizing signal between a plurality of scanning lines formed by the laser beam is restrained. Therefore, the shift of the image between the plurality of scanning lines is reduced. As a result, it is possible to form a high-quality image.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
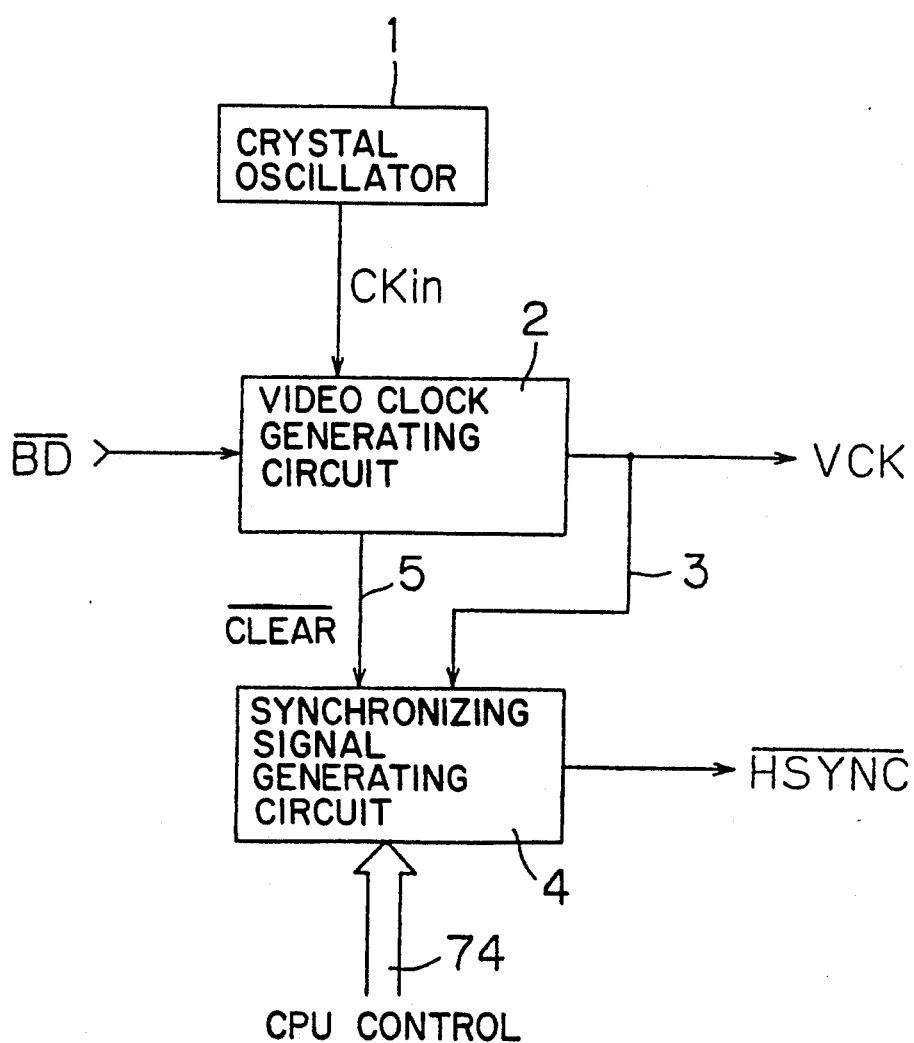
FIG. 1 is a block diagram showing the basic construction of a horizontal synchronizing signal generating device according to one embodiment of the present invention.

An embodiment will be described in detail with reference to the drawings. In the drawings, an overline given to a sign representing each signal indicates that the signal is a signal using negative logic. In the specification, the description of the overline is omitted.

FIG. 1 is a block diagram showing the entire construction of a horizontal synchronizing signal generating device according to one embodiment of the present invention. The horizontal synchronizing signal generating device is used in a laser beam printer to generate a horizontal synchronizing signal HSYNC for synchronizing the scanning of a photoreceptor by a laser beam and the processing of image data corresponding to an image to be printed. The horizontal synchronizing signal HSYNC must be synchronized with a beam detecting signal BD corresponding to the timing of the scanning of the photoreceptor by the laser beam. The beam detection signal BD is generated by, for example, disposing a light receiving element in a predetermined position scanned by the laser beam, to generate a pulse having a predetermined width on the basis of an output of the light receiving element.

The beam detection signal BD is applied to a video clock generating circuit 2. In this circuit 2, a video clock VCK for defining the operation of the laser beam printer is generated on the basis of a basic clock CKin from a crystal oscillator 1 serving as means for generating a signal having a reference frequency. The video clock generating circuit 2 generates a plurality of internal clocks which differ in phase from each other on the basis of the basic clock CKin as described later to output as the video clock VCK an internal clock whose phase difference from the beam detection signal BD is closest to a predetermined phase difference. The phase difference between the beam detection signal BD and the internal clock shall mean the time difference between the time when the beam detection signal BD has a predetermined phase angle (for example, 180°) and the time when the internal clock has a predetermined phase angle (for example, 0°), and the predetermined phase difference shall be, for example, zero in the present embodiment.

The video clock VCK is applied to a horizontal synchronizing signal generating circuit 4 from a line 3 in addition to respective portions of the laser beam printer as a clock for defining the processing operation of the image data. The horizontal synchronizing signal generating circuit 4 generates the horizontal synchronizing signal HSYNC having a predetermined pulse width which is synchronized with the beam detection signal BD on the basis of a control signal through a bus 74 from a CPU (central processing unit) outside of FIG. 1. The construction and the operation of the horizontal synchronizing signal generating circuit 4 will be described later. A clear signal CLEAR which is synchronized with the beam detection signal BD is outputted onto a line 5.

Figure 2:
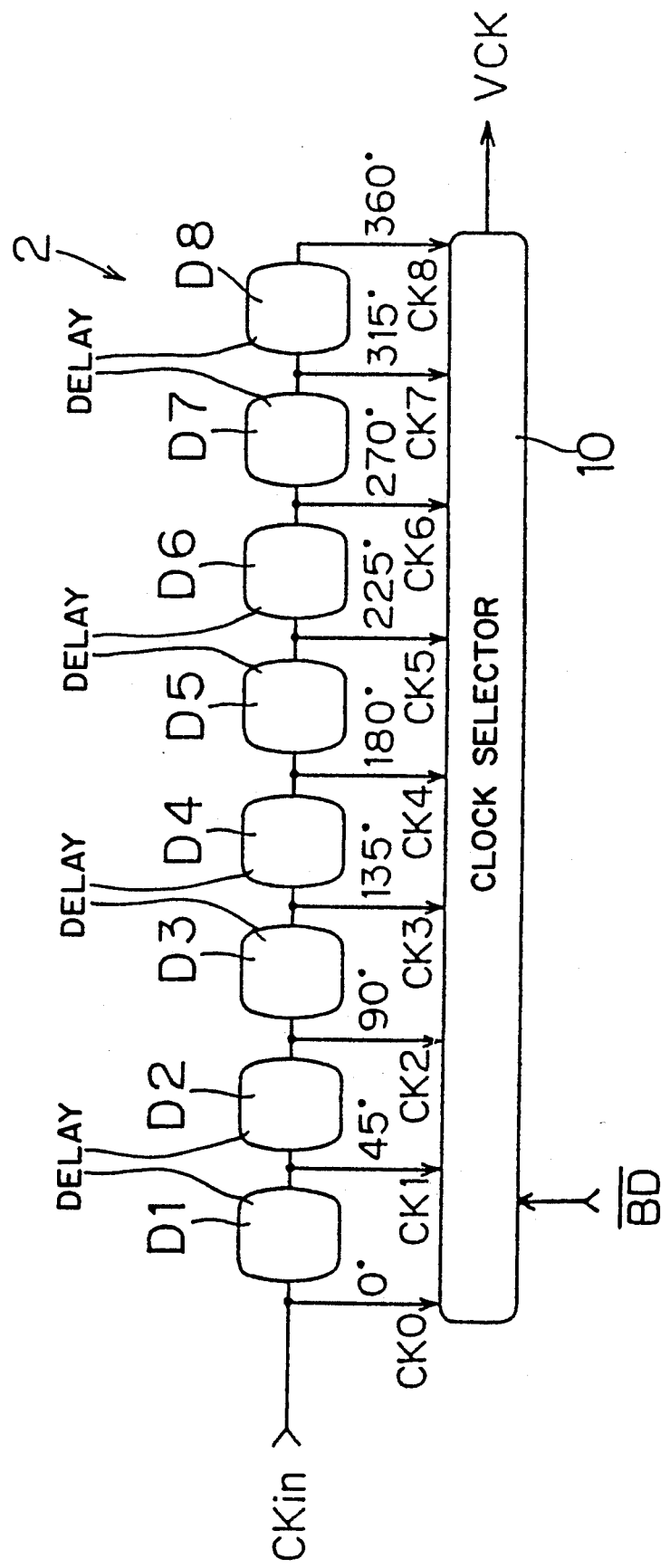
FIG. 2 is a block diagram showing the basic construction of a video clock generating circuit according to one embodiment of the present invention.

FIG. 2 is a block diagram showing the basic construction of the video clock generating circuit 2. For example, the crystal oscillator 1 generates a basic clock CKin having a frequency equal to the frequency of a desired video clock VCK. The basic clock CKin is inputted to a delay element D1 in the first stage out of delay elements D1, D2, D3, ..., D8 in a plurality of stages connected in series. Each of the delay elements D1 to D8 is constructed using an analog delay line, a logic gate and the like for delaying an input signal by a constant time to output the same. In the present embodiment, the delay elements D1 to D8 constitute a plurality of phase shifting means, and the phase of the basic clock CKin inputted is shifted by not less than 360° in the whole of the delay elements D1 to D8. The amount of shift in phase in each of the delay elements depends on the relationship between the basic clock CKin and the delay time of the signal in the delay element. In FIG. 2, a case is assumed where the phase of the basic clock CKin is shifted by 45° in each of the delay elements. Consequently, the delay element D1 constitutes means for shifting the phase by 45°, the delay elements D1 and D2 constitute means for shifting the phase by 90°, and the delay elements D1, D2 and D3 constitute means for shifting the phase by 135°. Similarly, means for shifting the phase by 180°, 225°, 270°, 315° and 360° are respectively constructed.

The basic clock CKin and output signals of the respective delay elements D1 to D8 are inputted as internal clocks CK0 to CK8 to a clock selector 10 serving as selecting means. The clock selector 10 selects one internal clock whose phase difference from the beam detection signal BD is closest to a predetermined phase difference out of the internal clocks CK0 to CK8 and outputs the selected internal clock as a video clock VCK.

The variation in the time relationship between the beam detection signal BD and the video clock VCK thus outputted from the clock selector 10 is not more than a value corresponding to 45° of basic clock CKin which is the amount of shift in phase in one delay element. Consequently, if the horizontal synchronizing signal HSYNC is generated on the basis of the video clock VCK which is thus synchronized with the beam detection signal BD with high precision, the variation in the time relationship between the horizontal synchronizing signal HSYNC generated and the beam detection signal BD can be small.

Figure 3:
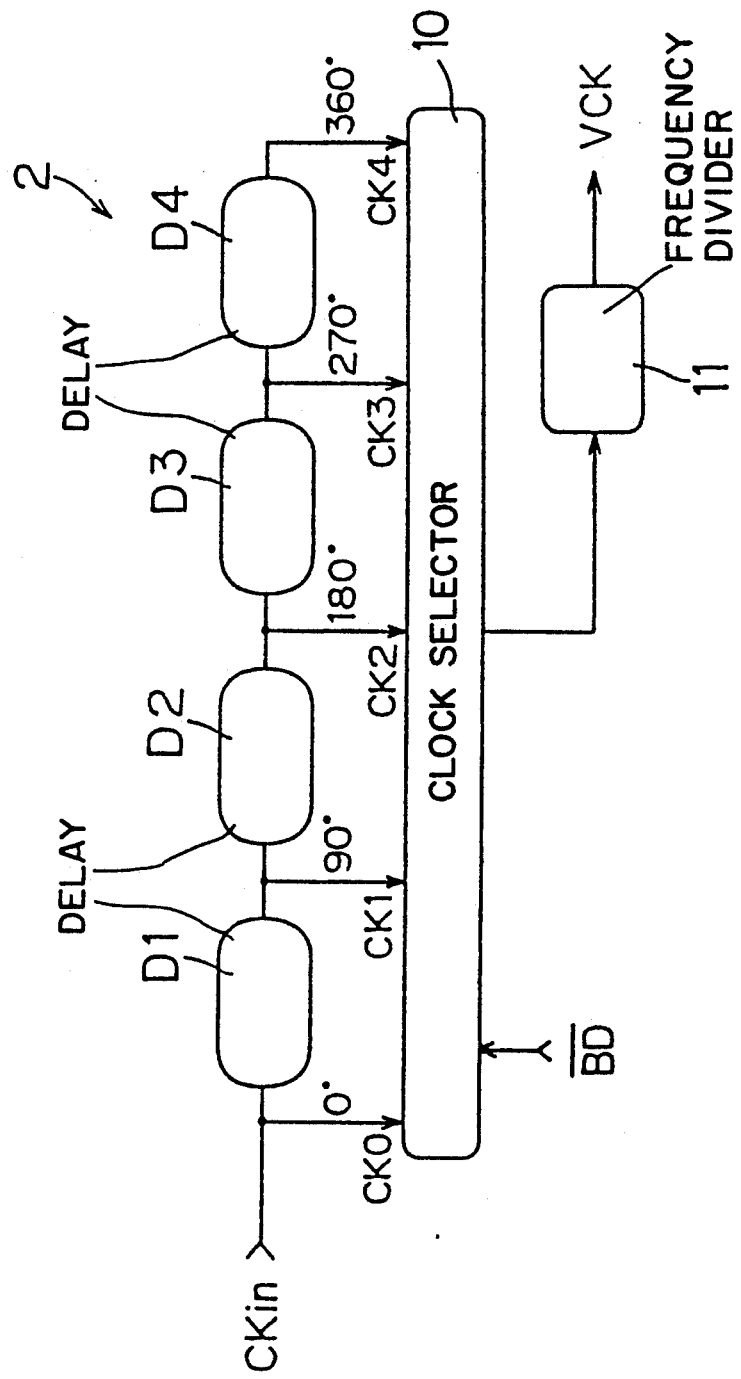
FIG. 3 is a block diagram showing another example of the construction of the video clock generating circuit.

FIG. 3 is a block diagram showing another example of the construction of the video clock generating circuit 2. Portions corresponding to the above described respective portions shown in FIG. 2 are assigned the same reference numerals in FIG. 3. In this construction, a basic clock CKin generated from the crystal oscillator 1 is a signal having a frequency which is two times that in the construction shown in FIG. 2, that is, a signal having a frequency which is two times that of a desired video clock VCK. An output signal of a frequency dividing circuit 11 for frequency-dividing a signal from a clock selector 10 into two is a video clock VCK.

As a result of doubling the frequency of the basic clock CKin in the construction shown in FIG. 2, the amount of shift in phase in each of delay elements D1 to D4 becomes two times that in the construction shown in FIG. 2, for example, 90°. Consequently, delay elements whose number is one-half that in the construction shown in FIG. 2 are only required so as to shift the phase by not less than 360° as a whole. Consequently, the number of the elements is reduced, thereby to make it possible to reduce the size and the cost of the laser beam printer. Moreover, the delay time in each of the delay elements D1 to D4 is equal to that in the construction shown in FIG. 2. Accordingly, the variation occurring in the time relationship between the beam detection signal BD and an internal clock selected is almost the same as that in the construction shown in FIG. 2.

Furthermore, even when an internal clock which differs in duty ratio from the basic clock CKin is generated by the delay of the signal in each of the delay elements D1 to D4, the video clock VCK obtained as the output signal of the frequency dividing circuit 11 becomes a good clock having a uniform duty ratio. Because the frequency dividing circuit 11 generates a pulse having a desired frequency on the basis of only the timing of, for example, the rising of the output signal of the clock selector 10.

Figure 4:
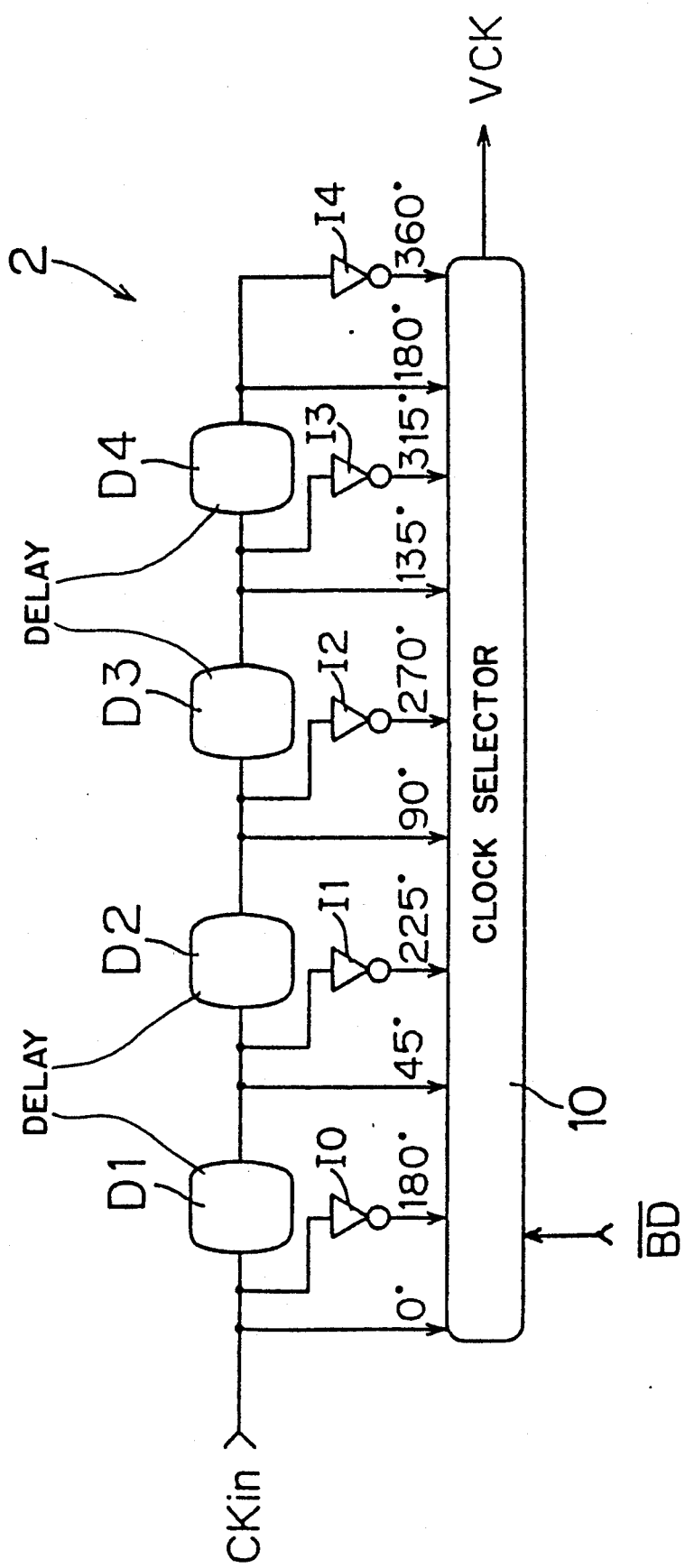
FIG. 4 is block diagram showing still another example of the construction of the video clock generating circuit.

FIG. 4 is a block diagram showing another example of the construction of the video clock generating circuit 2. In FIG. 4, portions corresponding to the respective portions shown in FIG. 2 are assigned the same reference numerals. In this construction, the crystal oscillator 1 generates a basic clock CKin having a frequency equal to that of a desired video clock VCK, similarly to the construction shown in FIG. 2. A plurality of delay elements D1 to D4 capable of shifting the phase by not less than 180° as a whole are used. More specifically, the number of the delay elements is approximately one-half that in the construction shown in FIG. 2.

This construction is characterized in that the basic clock CKin and respective output signals of the delay elements D1 to D4 are inputted to a clock selector 10 as internal clocks, and signals respectively obtained by inverting the basic clock CKin and the output signals of the delay elements D1 to D4 by inverters I0 to I4 are applied to the clock selector 10 as internal clocks. More specifically, assuming that the amount of shift in phase in one delay element is 45°, the respective output signals of the delay elements D1, D2, D3 and D4 become signals whose phase differences from the basic clock CKin are respectively 45°, 90°, 135° and 180°, and the output signals of the inverters I0 to I4 become signals whose phase differences are respectively 180°, 225°, 270°, 315° and 360°. As a result, a plurality of internal clocks which are 45° and a maximum of 360° in phase with each other are inputted to the clock selector 10.

In this construction, the number of the delay elements can be reduced by approximately half, as obvious from the comparison with the construction shown in FIG. 2. This is particularly advantageous when the amount of shift in phase in each of the delay elements is set to be very small to generate several of internal clocks. A delay element having a large capacity is replaced with an inverter having a relatively small capacity, thereby to make it possible to make the entire laser beam printer small in size and lightweight.

Figure 5:
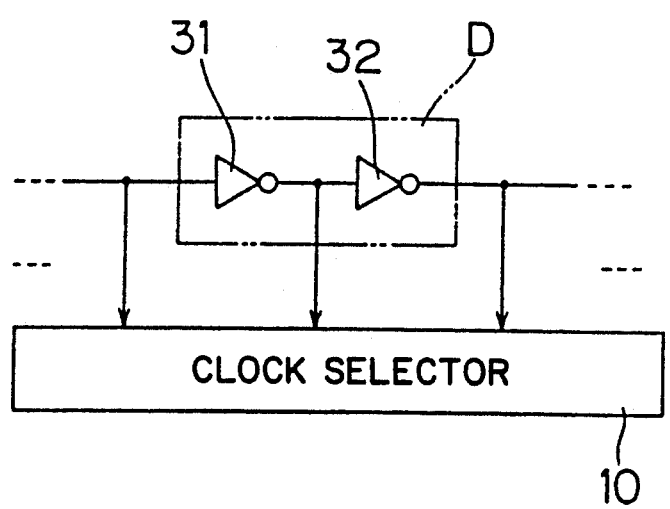
FIG. 5 is a block diagram showing an example of the construction of a delay element.

Meanwhile, when a delay element D constituted by a series circuit comprising a pair of inverters 31 and 32 is used as the delay elements D1 to D4 as shown in FIG. 5, for example, the number of the delay elements can be further reduced if an output of the first inverter 31 and an output of the second inverter 32 are both inputted to the clock selector 10 internal clocks.

Figure 6:
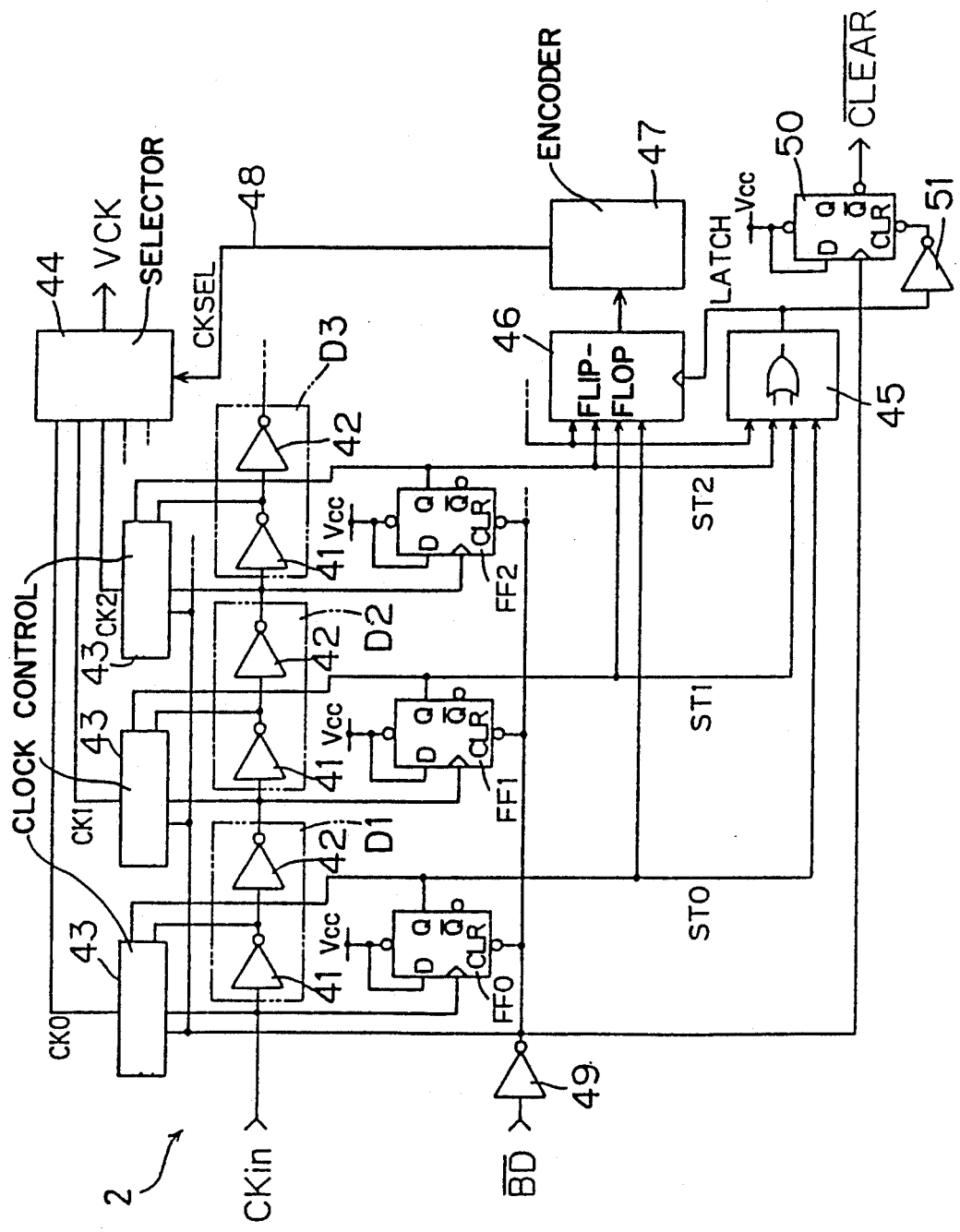
FIG. 6 is a block diagram showing an example of the specific construction of the video clock generating circuit.

FIG. 6 is a block diagram showing an example of the specific construction of the video clock generating circuit 2 shown in FIG. 2. A pair of inverters 41 and 42 constitutes each of delay elements D1, D2, . . . . A basic clock CKin from the crystal oscillator 1 is inputted to the delay element D1 in the first stage. The basic clock CKin and respective outputs of the delay elements D1, D2, . . . are respectively applied to a selector 44 as internal clocks CK0, CK1, CK2, . . . through clock control circuits 43 as described later.

D (Delayed)-type flip-flops FF0, FF1, FF2, . . . are provided corresponding to the internal clocks CK0, CK1, CK2, . . . . The flip-flops have their clock input terminals receiving the internal clocks CK0, CK1, CK2, . . . before passing through the clock control circuits 43, have their data input terminals receiving a power-supply voltage Vcc, and have their clear input terminals receiving a signal obtained by inverting a beam detection signal BD by an inverter 49. Furthermore, signals ST0, ST1, ST2, . . . which are respective Q outputs of the flip-flops are inputted to an OR circuit 45.

In the present embodiment, the beam detection signal BD is a signal using negative logic which falls to a low level at predetermined timing with respect to the scanning of a photoreceptor using a laser beam and rises to a high level after it is maintained at a low level for a constant time. The flip-flops FF0, FF1, FF2, . . . are cleared in a time period during which the beam detection signal BD is at a high level, so that all their output signals ST0, ST1, ST2, . . . are at a low level. When the beam detection signal BD fails to a low level, the flip-flops FF0, FF1, FF2, . . . invert the respective Q outputs to a high level in synchronization with the rising of the internal clocks CK0, CK1, CK2, . . . Consequently, an output signal of the OR circuit 45 is inverted to a high level at the time point where the Q output of any one of the flip-flops is inverted to a high level after the beam detection signal BD falls.

The output signal of the OR circuit 45 is applied as a latch signal LATCH to a D-type flip-flop 46 constituted by a plurality of parallel stages. The flip-flop 46 latches the output signals ST0, ST1, ST2, . . . of the flip-flops FF0, FF1, FF2, . . . in parallel in synchronization with the rising of the latch signal LATCH. Since any one of the output signals latched is only at a high level, combination of the signals latched in parallel in the flip-flop 46 indicates which internal clock out of the internal clocks CK0, CK1, . . . is best synchronized with the beam detection signal BD. The signals latched in parallel in the flip-flop 46 are encoded by an encoder 47 and are inputted to a selector 44 from a line 48 as a clock selection signal CKSEL (for example, a 16-bit signal). Any one of the internal clocks which corresponds to the clock selection signal CKSEL is selected in a selector 44, and the selected internal clock is outputted as a video clock VCK. Meanwhile, when nine internal clocks CK0 to CK8 which are 45° out of phase are generated in the delay elements D1, D2, D3, . . . , signals which are 360° out of phase are generated. Accordingly, a case is considered where two signals out of the signals ST0, ST1, ST2, . . . latched by the flip-flop 46 are simultaneously at a high level. In order to cause the selector 44 to select one internal clock in this case, a higher order signal (it is assumed that STi is higher in order than ST (i+1)), for example, may be assigned priority in the encoder 47 to generate the clock selection signal CKSEL.

The signal obtained by inverting the beam detection signal BD by the inverter 49 is also applied to a clock input terminal of a flip-flop 50 for generating a clear signal CLEAR to be applied to the horizontal synchronizing signal generating circuit 4 (see FIG. 1). The flip-flop 50 has its data input terminal receiving a power-supply voltage Vcc, and has its clear input terminal receiving an output of the OR circuit 45 through an inverter 51. In the flip-flop 50, a Q bar output enters a low level in synchronization with the falling of the beam detection signal BD. In addition, the flip-flop 50 is cleared in synchronization with the rising of the output signal of the OR circuit 45 so that the Q bar output enters a high level. This Q bar output becomes the clear signal CLEAR.

Figure 7:
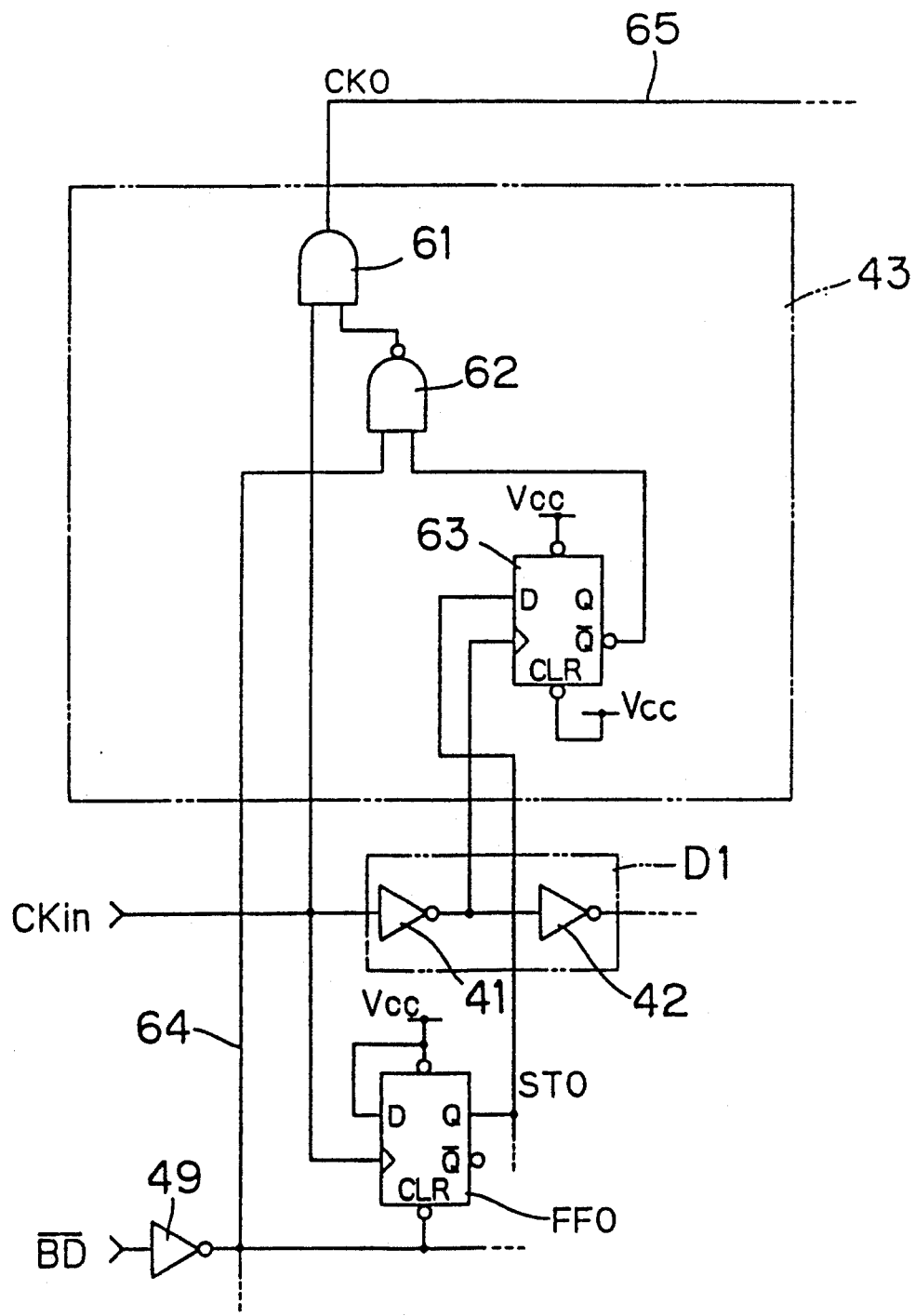
FIG. 7 is a block diagram showing the construction of a clock control circuit.

FIG. 7 is a block diagram showing the construction of a clock control circuit 43. Although FIG. 7 shows only the construction associated with the internal clock CK0, the construction associated with each of the other internal clocks CK1, CK2, . . . is the same. The clock control circuit 43 is a circuit for preventing the first clock from being generated after the beam detection signal BD falls, which allows the malfunction of the horizontal synchronizing signal generating circuit 4 as described later to be prevented. More specifically, the selector 44 switches the internal clocks at the timing immediately after the falling of the beam detection signal BD. Immediately after the internal clocks are switched, however, a signal having a extremely small pulse width is liable to be generated. The signal having a small pulse width may cause a malfunction in the horizontal synchronizing signal generating circuit 4.

The clock control circuit 43 comprises an AND gate 61, a NAND gate 62, and a D-type flip-flop 63. The flip-flop 63 has its data input terminal receiving an output signal ST0 of a flip-flop FF0, has its clock input terminal receiving an output signal of a first inverter 41 in a delay element D1, and has its clear input terminal receiving an inverted one of a power-supply voltage Vcc. Consequently, the flip-flop 63 latches the signal ST0 every time the signal to the clock input terminal rises.

A Q bar output of the flip-flop 63 is applied to one input terminal of the NAND gate 62. A signal obtained by inverting a beam detection signal BD by an inverter 49 is applied to the other terminal of the NAND gate 62 from a line 64. An output of the NAND gate 62 is applied to one terminal of an AND gate 61, to control outputting of a basic clock CKin inputted to the other terminal of the AND gate 61.

The flip-flop FF0 is in a cleared state in a time period before the beam detection signal BD falls, so that the output signal ST0 is at a low level. Consequently, the Q bar output of the flip-flop 63 is at a high level. On the other hand, the beam detection signal BD is at a high level, so that the signal obtained by inverting the beam detection signal BD by the inverter 49 is at a low level. Consequently, the output of the NAND gate 62 enters a high level. Therefore, the basic clock CKin is outputted onto a line 65 through the AND gate 61, to be applied to the selector 44.

When the beam detection signal BD falls, the output of the inverter 49 enters a high level. In a time period during which the Q bar output of the flip-flop 63 is at a high level, therefore, the output of the NAND gate 62 enters a low level. Consequently, in a time period during which the Q bar output of the flip-flop 63 is kept at a high level after the beam detection signal falls, the basic clock CKin is prevented from being outputted.

It is when the Q bar output of the flip-flop 63 enters a low level that the basic clock CKin is outputted onto the line 65 again. That is, it is when the output signal ST0 of the flip-flop FF0 enters a high level by the rising of the basic clock CKin, and the high-level signal is latched in the flip-flop 63 by the rising of the output signal of the inverter 41. The rising of the output signal of the inverter 41 is delayed by a time period which is approximately a half-period of the basic clock CKin from the rising of the output signal ST0 of the flip-flop FF0. As a result, one clock is prevented from being outputted after the beam detection signal BD falls. Thereafter, the basic clock CKin is outputted again as an internal clock CK0 onto the line 65.

Figure 8:
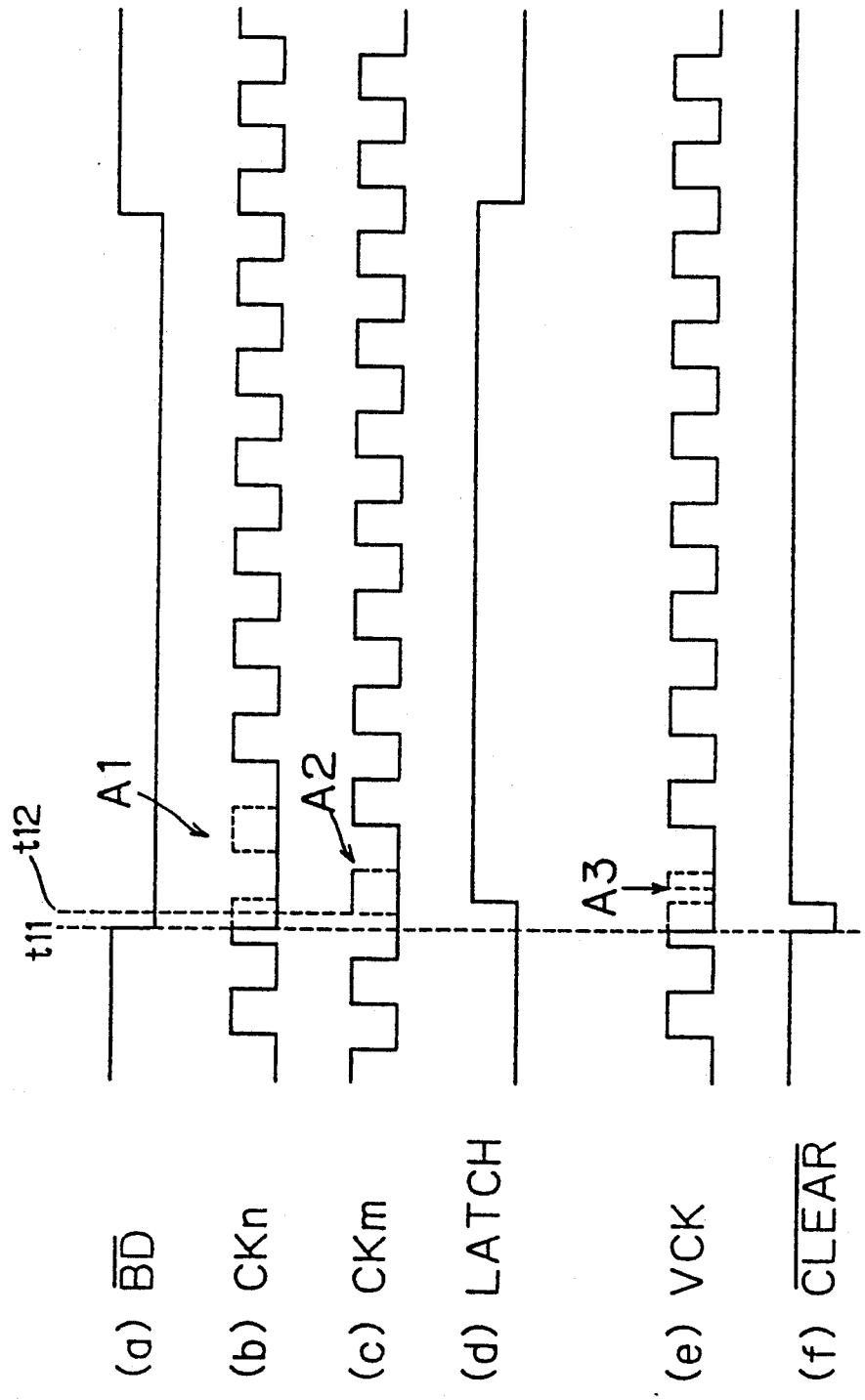
FIG. 8 is a timing chart for explaining the operation of the video clock generating circuit.

FIG. 8 is a timing chart for explaining the operation of the above described video clock generating circuit. Line (a) of FIG. 8 shows a beam detection signal BD, lines (b) and (c) show different internal clock signals CKn and CKm (n and m are integers of not less than zero), line (d) of FIG. 8 shows a latch signal LATCH which is an output signal of the OR circuit 45, line (c) of FIG. 8 shows a video clock VCK outputted from the selector 44, and line (f) of FIG. 8 shows a clear signal CLEAR outputted from the flip-flop 50.

In FIG. 8, a case is assumed where an internal clock CKm is an internal clock which first rises after the beam detection signal BD falls, and an internal clock CKn is selected as a video clock VCK by the selector 44 in a time period before the falling of the signal BD.

When the beam detection signal BD falls at the time t11, the internal clocks CKn and CKm are prevented from being outputted, as represented by reference signs A1 and A2, by the function of the clock control circuit 43. Thereafter, when the internal clock CKm before being inputted to the clock control circuit 43 (represented by a broken line in line (c)) rises at the time t12, the output signal STm of the flip-flop FFm rises earlier than the output signals ST0, ST1, . . . , ST(m−1), ST(m+1), . . . of the other flip-flops FF0, FF1, . . . , FF(m−1), FF(m+1), . . . . In response to the rising, the latch signal LATCH which is the output signal of the OR circuit 45 rises, so that the output signals ST0, ST1, ST2, . . . of the flip-flops FF0, FF1, FF2, . . . are latched in the flip-flop 46. As a result, the selector 44 switches an internal clock to be selected from the internal clock CKn to the internal clock CKm at the timing represented by reference sign A3. In a time period before and after the switching, no clock is outputted by the function of the clock control circuit 43, so that the video clock VCK is stable at a low level.

The clear signal CLEAR outputted from the flip-flop 50 falls in synchronization with the falling of the beam detection signal BD, while rising in synchronization with the rising of the latch signal LATCH.

Such an operation is performed every time the beam detection signal BD falls. Consequently, an internal clock which is best synchronized with the timing of the falling of the beam detection signal BD is selected as a video clock VCK for each laser beam scanning. For example, assuming that the delay elements D1, D2, D3, . . . respectively shift the phase of the input signal by 45°, there is only variation corresponding to the delay time in each of the delay elements D1, D2, D3, . . . between a plurality of scanning lines in the time relationship between the beam detection signal BD and the video clock VCK.

Figure 9:
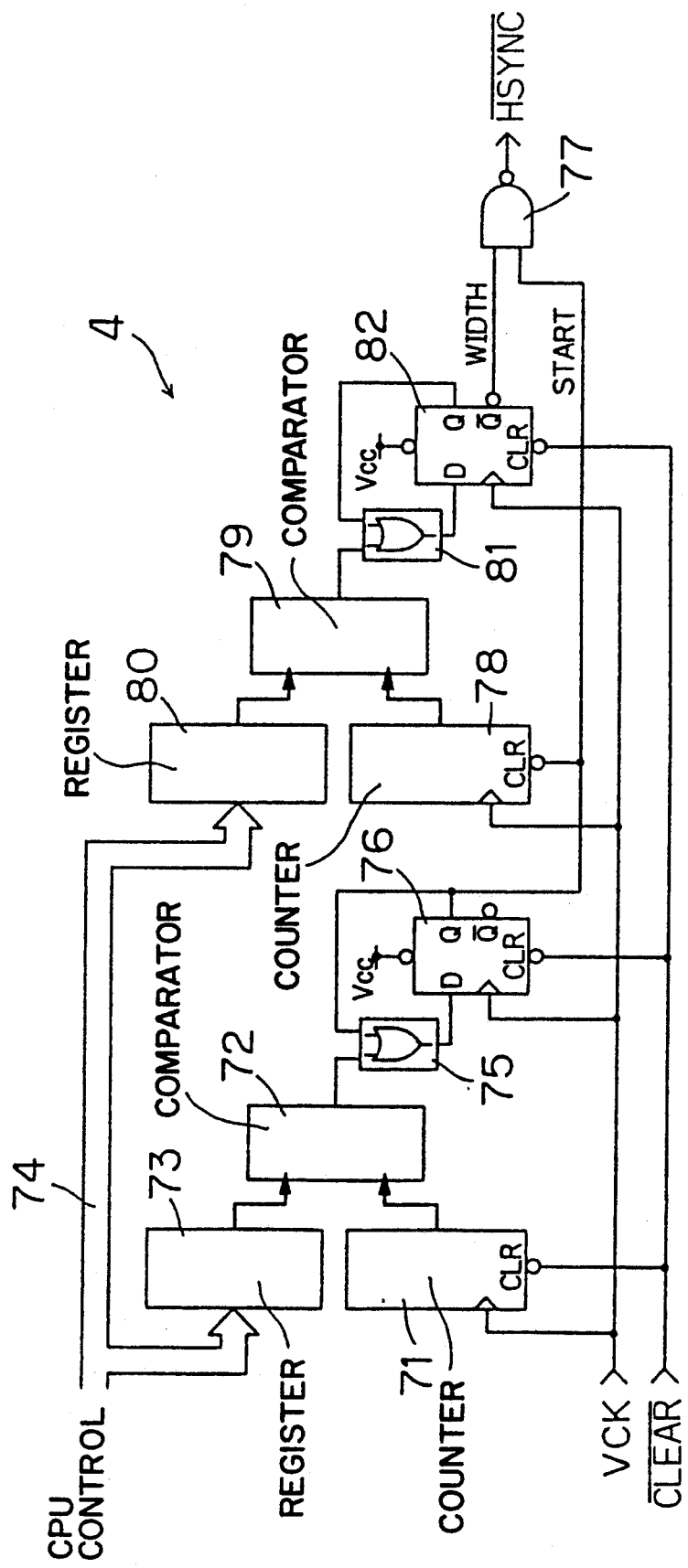
FIG. 9 is a block diagram showing the basic construction of a horizontal synchronizing signal generating circuit.

FIG. 9 is a block diagram showing an example of the specific construction of the horizontal synchronizing signal generating circuit 4. A video clock VCK is counted by a counter 71 cleared by a clear signal CLEAR. In a comparator 72, the counted value of the counter 71 is compared with a predetermined value held in a register 73. The predetermined value is applied to the register 73 through a bus 74 from a CPU outside of FIG. 9 for controlling the operation of the entire laser beam printer. For example, the predetermined value is "1" in the present embodiment.

The comparator 72 outputs a high-level signal when the counted value of the counter 71 equals to the value held in the register 73. An output signal of the comparator 72 is applied to a data input terminal of a D-type flip-flop 76 through an OR gate 75 and is latched by the video clock VCK. A Q output of the flip-flop 76 is fed back to the data input terminal of the flip-flop 76 through the OR gate 75. Consequently, when the Q output enters a high level once, the flip-flop 76 keeps the Q output at a high level until it is cleared by the clear signal CLEAR.

An output signal of the flip-flop 76 is applied to one input terminal of a NAND gate 77 provided in the final stage as a signal START for defining the timing of the start of a horizontal synchronizing signal HSYNC as well as to a clear input terminal of a counter 78 for defining the pulse width of the horizontal synchronizing signal HSYNC. The counter 78 is cleared by the signal START and then, counts the video cock VCK.

In a comparator 79, the counted value of the counter 78 is compared with a value held in a register 80 for holding a predetermined value applied from the CPU through the bus 74. The predetermined value held in the register 80 is, for example, "5" in the present embodiment. The comparator 79 outputs a high-level signal when the counted value of the counter 78 equals to the value held in the register 80, so that the signal is applied to a data input terminal of a D-type flip-flop 82 from an OR gate 81 and is latched in response to the video clock VCK. The flip-flop 82 is cleared by the clear signal CLEAR, and its Q output is fed back to the data input terminal through the OR gate 81. Accordingly, when the Q output rises once, the flip-flop 81 keeps the Q output at a high level before the clear signal CLEAR is inputted.

A Q bar output of the flip-flop 82 is applied to the above described NAND gate 77 as a signal WIDTH for defining the end of the horizontal synchronizing signal HSYNC. An output signal of the NAND gate 77 becomes a horizontal synchronizing signal HSYNC.

Figure 10:
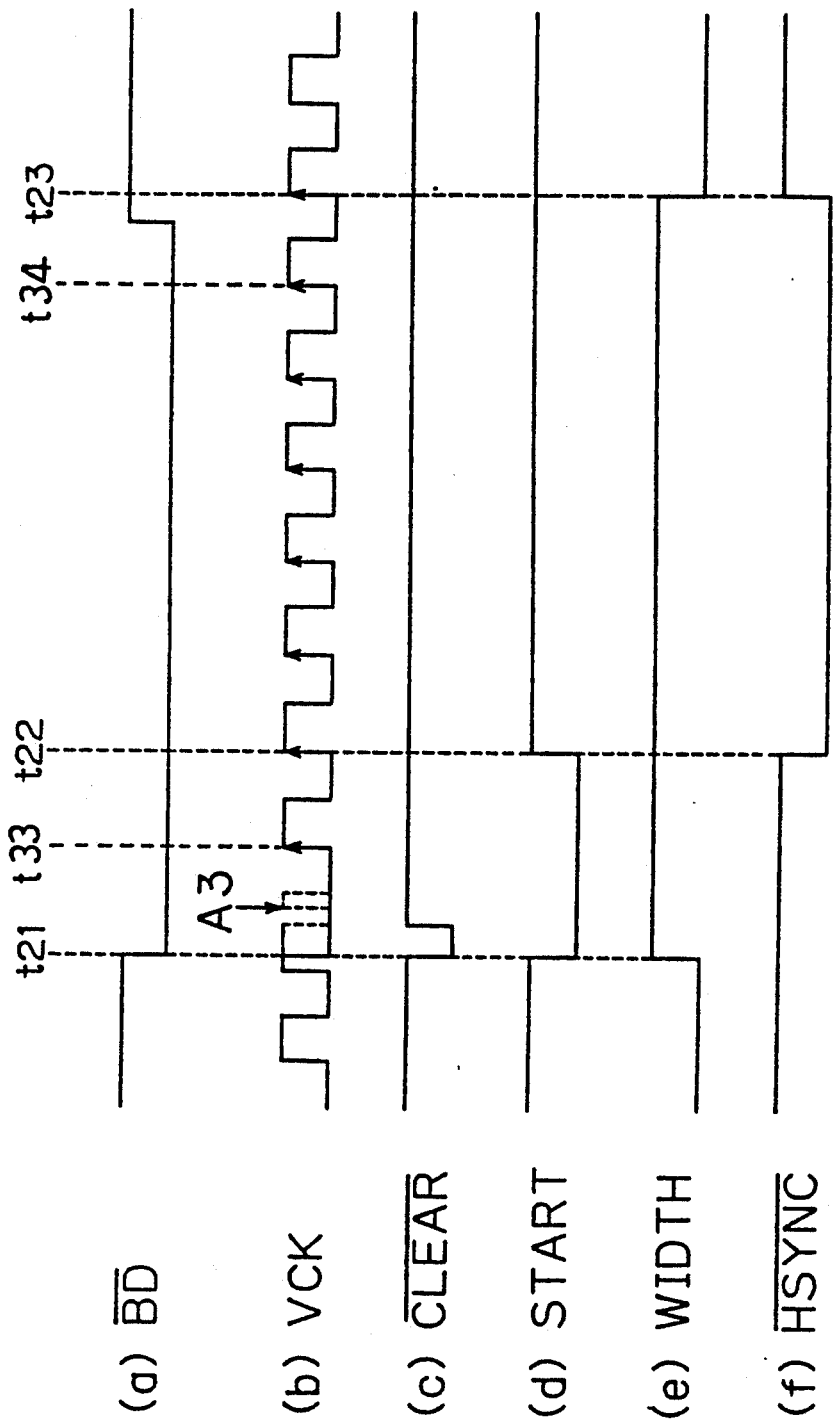
FIG. 10 is a timing chart for explaining the operation of the horizontal synchronizing signal generating circuit.
Figure 11:
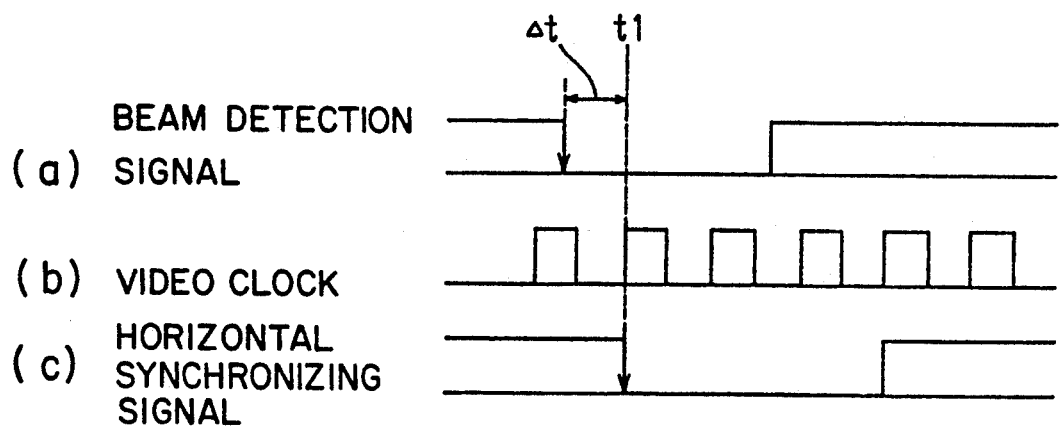
FIG. 11 is a timing chart for explaining the prior art.

FIG. 10 is a timing chart for explaining an operation of the horizontal synchronizing signal generating circuit 4 of the above described construction. Line (a) of FIG. 10 shows a beam detection signal BD, line (b) of FIG. 10 shows a video clock VCK, line (c) shows a clear signal CLEAR, line (d) shows a signal START outputted from the flip-flop 76, line (e) shows a signal WIDTH which is a Q bar output of the flip-flop 82, and line (f) of FIG. 10 shows a horizontal synchronizing signal HSYNC outputted from the NAND gate 77.

When the beam detection signal BD falls at the time t21, the clear signal CLEAR falls in synchronization with the falling of the signal BD. Accordingly, the counter 71 and the flip-flop 76 and 82 are cleared. Consequently, the signal START which is a Q output of the flip-flop 76 falls, and the signal WIDTH which is a Q bar output of the flip-flop 82 rises.

In a time period during which the signal START is at a low level, the counter 78 is kept in a cleared state. At the time t33 when the video clock VCK first rises after the time t21, the counted value of the counter 71 becomes "1", which coincides with the value held in the register 73. Consequently, an output of the comparator 72 enters a high level. At the time t22 when the video clock VCK subsequently rises, the signal START which is a Q output of the flip-flop 76 is inverted to a high level. Therefore, the counter 78 starts counting.

At the time t34 when the video clocks VCK rise five times after the time 22, the counted value of the counter 78 becomes "5", which coincides with the value held in the register 80. Consequently, an output of the comparator 79 enters a high level. Therefore, the signal WIDTH which is an output of the flip-flop 82 falls to a low level at the time t23 when the video clock VCK subsequently rises.

In the above described manner, both the signals START and WIDTH are at a high level in a time period from the time t22 to the time t23 corresponding to six periods of the video clock VCK. Accordingly, the horizontal synchronizing signal HSYNC which is at a low level over this time period corresponding to six periods of the video clock VCK is generated from the NAND gate 77.

The video clock VCK is switched to an internal clock which rises earliest after the time when the beam detection signal BD falls at the time point represented by reference sign A3. Therefore, the timing (the time t22) of the falling of the horizontal synchronizing signal HSYNC with respect to the falling of the beam detection signal BD is set on the basis of the video clock VCK with high precision by suppressing variation for each scanning line to time corresponding to the delay time in each of the delay elements D1, D2, D3, . . . . As a result, the variation in the time relationship between the horizontal synchronizing signal HSYNC and the beam detection signal BD can be restrained.

Since one clock is prevented from being outputted immediately after the beam detection signal BD falls in each of the internal clocks CK0, CK1, CK2, ... by the clock control circuit 43 shown in FIG. 7. Accordingly, a short pulse is prevented from occurring when the internal clocks are switched, so that the short pulse is prevented from being erroneously counted by the counter 71. Therefore, a time period elapsed from the falling of the beam detection signal BD until the horizontal synchronizing signal HSYNC falls (from the time t21 to the time t22) is set with high precision. Consequently, the horizontal synchronizing signal HSYNC can be synchronized with the beam detection signal BD with high precision.

As described in the foregoing, in the horizontal synchronizing signal generating device according to the present embodiment, the variation in the time relationship between the beam detection signal BD and the horizontal synchronizing signal HSYNC occurring between a plurality of scanning lines can be significantly restrained, and the horizontal synchronizing signal HSYNC can be synchronized with the beam detection signal BD with high precision. Consequently, the shift of an image in the direction of main scanning between the plurality of scanning lines can be restrained, thereby to make it possible to do high-quality printing.

Moreover, the basic clock CKin requires no signal having an excessively higher frequency than the frequency of a desired video clock VCK. Accordingly, there occurs no problems such as the increase in processing speed of a horizontal synchronizing signal generating circuit. Consequently, the circuit can be easily designed, and the measures against noise can be satisfactorily taken.

Meanwhile, the present invention is not limited to the above described embodiment. For example, although in the above described embodiment, a clock control circuit is provided for each internal clock, only one similar clock control circuit may be provided in the stage subsequent to the selector 44. In addition, although in the above described embodiment, description was made by taking as an example a laser beam printer, the present invention can be widely applied to the other image forming apparatuses using a laser beam such as a digital copying machine.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video clock generating circuit for generating a video clock for defining a data processing operation for each pixel in an image forming apparatus which uses a laser beam, said circuit comprising:

beam detection signal generating means for generating a beam detection signal corresponding to the timing of laser beam scanning;
   reference frequency signal generating means for generating a reference frequency signal;
   a plurality of phase shifting means for shifting the phase of the reference frequency signal from the reference frequency signal generating means to generate a plurality of output signals which differ in phase by a predetermined amount;
   a plurality of inverting means for respectively inverting output signals from the plurality of phase shifting means to provide a plurality of inverted output signals,
   selecting means receiving respective output signals of the plurality of phase shifting means and the plurality of inverting means for selecting any one output signal whose phase difference from said beam detection signal is closest to a predetermined phase difference from among the output signals of said plurality of phase shifting means and said plurality of inverting means, the phase difference from the beam detection signal being the time difference between the time when the beam detection signal has a predetermined phase angle and the time when the respective output signals of the phase shifting means and the inverting means have a predetermined phase angle, to output the selected output signal as a video clock.

2. The video clock generating circuit according to claim 1, wherein
   said phase shifting means is constituted by delay means for delaying an input signal by a constant time to output the same.

3. The video clock generating circuit according to claim 1, wherein
   the output signal of the reference frequency signal generating means and its inverted signal, along with the output signals of said plurality of phase shifting means and the output signals of said plurality of inverting means, are applied to the selecting means, and
   the phase shifting means in which the amount of shift in phase is largest out of said plurality of phase shifting means shifts the phase of the output signal of said reference frequency signal generating means by not less than 180°.

4. A horizontal synchronizing signal generating device for generating a horizontal synchronizing signal for synchronizing laser beam scanning and image data processing in an image forming apparatus using a laser beam, said device comprising:

beam detection signal generating means for generating a beam detection signal corresponding to the timing of laser beam scanning:
   reference frequency signal generating means for generating a reference frequency signal;
   a plurality of phase shifting means for shifting the phase of the reference frequency signal from the reference frequency signal generating means to generate a plurality of output signals which differ in phase by a predetermined amount;
   selecting means receiving respective output signals of the plurality of phase shifting means for selecting any one output signal whose phase difference from said beam detection signal is closest to a predetermined phase difference from amount the output signals of the plurality of phase shifting means, the phase difference from the beam detection signal being the time difference between the time when the beam detection signal has a predetermined phase angle and the time when the output signal of the phase shifting means has a predetermined phase angle, to output the selected output signal as a video clock;

a horizontal synchronizing signal generating circuit receiving said beam detection signal and the video clock from said selecting means for generating a horizontal synchronizing signal which is synchronized with said beam detection signal by counting said video clock on the basis of said beam detection signal; and clock control means for preventing said video clock from being inputted to said horizontal synchronizing signal generating circuit in a time period immediately before and after selecting the signal to be the video clock in said selecting means.

5. The horizontal synchronizing signal generating device according to claim 4, wherein the output signal of the reference frequency signal generating means, along with the output signals of the plurality of phase shifting means, is directly applied to said selecting means, and the phase shifting means in which the amount of shift in phase is largest out of said phase shifting means shifts the phase of the output signal of said reference frequency signal generating means by not less than 360°.

6. The horizontal synchronizing signal generating device according to claim 4, wherein:

said phase shifting means includes a delay means for delaying a signal input thereto by a constant time to output the same.

7. The horizontal synchronizing signal generating device according to claim 4, wherein the frequency of the signal having a reference generated by said reference frequency signal generating means is a predetermined times the frequency of a desired video clock, and which further comprises frequency dividing means for frequency-dividing the output signal of said selecting means into a signal having a frequency equal to the frequency of said desired video clock to output the signal obtained by the frequency division as a video clock, 8. The horizontal synchronizing signal generating device according to claim 4, which further comprises a plurality of inverting means for respectively inverting the output signals of the plurality of phase shifting means, said selecting means selecting as a video clock any one of the output signals of said plurality of phase shifting means and said plurality of inverting means.

9. The horizontal synchronizing signal generating device according to claim 8, wherein:

the reference frequency signal and its inverted signal, along with the output signals of said plurality of phase shifting means and the output signals of said plurality of inverting means, are applied to the selected means, and said plurality of phase shifting means includes a largest phase shifting means which shifts the phase of the output signal of said reference frequency signal generating means by not less than 180°.

10. A horizontal synchronizing signal generating device for generating a horizontal synchronizing signal for synchronizing laser beam scanning and image data processing in an image forming apparatus using a laser beam, said device comprising:

beam detection signal generating means for generating a beam detection signal corresponding to the timing of laser beam scanning;

reference frequency signal generating means for generating a reference frequency signal;

a plurality of phase shifting means for shifting the phase of the reference frequency signal from the reference frequency signal generating means to generate a plurality of output signals which differ in phase by a predetermined amount;

a plurality of inverting means for respectively inverting the output signals of the plurality of phase shifting means to provide inverted output signals;

selecting means receiving respective output signals of the plurality of phase shifting means and the plurality of inverting means for selecting any one output signal whose phase difference from said beam detection signal is closest to a predetermined phase difference from among the output signals of the plurality of phase shifting means and the plurality of inverting means, the phase difference from the beam detection signal being the time difference between the time when the beam detection signal has a predetermined phase angle and the time when the output signal of the respective output signals of the phase shifting means and the inverting means have a predetermined phase angle, to output the selected output signal as a video clock; and a horizontal synchronizing signal generating circuit receiving said beam detection signal and the video clock from said selecting means for generating a horizontal synchronizing signal which is synchronized with said beam detection signal by counting said video clock on the basis of said beam detection signal.

11. The horizontal synchronizing signal generating device according to claim 10, wherein the reference frequency signal and its inverted signal, along with the output signals of said plurality of phase shifting means and the output signals of said plurality of inverting means, are applied to the selecting means, and said plurality of phase shifting means includes a largest phase shifting means which shifts the phase of the output signal of said reference frequency signal generating means by not less than 180°.

12. The horizontal synchronizing signal generating device according to claim 10, wherein said phase shifting means includes delay means for delaying a signal input thereto by a constant time to output the same.

* * * * *